Nov. 3, 1959  C. E. KENNEY  2,910,894
ELASTIC FLUID TURBINE TWO SPEED DRIVE ARRANGEMENT
Filed April 1, 1957

Inventor
Clarence E. Kenney
By Howard B. Scheckman
Attorney

United States Patent Office 2,910,894
Patented Nov. 3, 1959

2,910,894

ELASTIC FLUID TURBINE TWO SPEED DRIVE ARRANGEMENT

Clarence E. Kenney, Hartland, Wis., assignor to Allis-Chalmers Manufacturing Company, Milwaukee, Wis.

Application April 1, 1957, Serial No. 649,768

6 Claims. (Cl. 74—812)

This invention relates to a drive arrangement for turning the spindle of a turbine and more particularly to a two speed drive, that turns a spindle so it will be evenly heated or cooled prior to being placed in, or taken out of operation, and which facilitates easy disassembly of the turbine casing and spindle.

A turbine is heated before it is put into operation. A drive arrangement turns the spindle while small amounts of elastic fluid are admitted to heat up the spindle and turbine casing. This decreases stresses due to differences in thickness of the various parts. If the turbine were placed under load when cold, the parts would warp and distort as they heat up, and could be damaged.

Similarly, when a turbine is taken out of operation, rotation of the spindle is not stopped. If rotation of the spindle were stopped, the spindle would bow as it cools. Thermal distortions would result due to different cooling rates of the various parts. For this reason a drive arrangement is used to rotate the spindle so it will cool evenly.

In prior art devices, a single speed motor is used to turn the spindle while it is being heated or cooled. See, for example, U.S. Patent 2,245,175. The single speed motor drives the spindle through a single ratio speed reducing gear train that includes a connecting gear. The connecting gear engages gear teeth provided on the spindle and rotates the spindle.

The connecting gear rotates away from the spindle of the turbine, whenever steam rotates the spindle faster than the connecting gear rotates. This provides a smooth change from motor to steam drive.

The disadvantage of a single speed motor is that unless a very large and expensive motor is used, there is not enough power to start the spindle from rest and rotate it faster than 3 or 4 r.p.m. At this speed, although there is sufficient oil to lubricate the bearings, the coefficient of friction (approximately .05) is higher than when the shaft rotates at higher speeds (approximately .001).

At higher speeds (above 16 r.p.m.) there is oil film lubrication. The spindle itself acts as an oil pump and aids in forming the oil film.

Additionally, although the spindle can be uniformly heated or cooled at a slow speed of 3 or 4 r.p.m., the turbine casing cannot. The spindle turns too slowly to evenly distribute the elastic fluid in the casing and uniformly cool or warm all the parts.

Clearly, it is desirable to rotate the spindle at higher speeds, since this requires less power, and provides more uniform heating and cooling. Additionally, it is essential to use a connecting gear adapted for oscillatory movement with respect to the spindle and the drive arrangement to retain the automatic disengagement feature that provides a safe change from motor to steam drive.

The disadvantage of a single speed motor rotating at slow speed can be remedied. A two speed gear train can be used in place of the single speed gear train. A two speed gear train can provide a high torque at slow speed to start the spindle turning and once turning it can increase the speed of the spindle.

Until my invention, the connecting gear has made employment of a two speed gear train difficult. During the time the motor is disconnected from the gear train to shift from the slower to the higher speed, the spindle rotates as a flywheel. The effect is the same as though the spindle were being rotated faster than the connecting gear by the steam. This causes the connecting gear to disengage from the spindle. This makes it necessary to use a complicated gear shift system that can be shifted from the slower to the higher speed while the motor continues turning the spindle. This arrangement would be expensive, and difficult to service and maintain.

Additionally, in prior art devices the speed reducing gear train including the connecting gear is mounted above the axis of the spindle. If the connecting gear is mounted below the axis of the spindle, the connecting gear drops away from the spindle when the speed of the motor decreases due to normal fluctuations in its speed. This mounting above the axis of the spindle makes it difficult to remove the turbine casing and the spindle, because the motor and speed reducing arrangement must be moved.

It is an object of this invention to provide a two speed drive for a spindle. Said two speed drive includes a two speed gear train containing a connecting gear mounted below the spindle. The two speed drive can start a spindle turning at slow speed and bring it up to a higher speed where the coefficient of friction is less, without the connecting gear disengaging from the spindle.

It is another object of this invention to provide a two speed drive that permits easy disassembly of the turbine casing and spindle.

This invention involves the use of a reversible auxiliary drive that turns the spindle through an underslung speed reducing gearing arrangement. The speed reducing gearing arrangement incorporates overrunning clutches and the connecting gear. When the speed reducing gearing arrangement is rotated in one direction by the auxiliary driver, it provides a high torque and starts the spindle turning. When rotated in a reverse direction it turns the spindle (still in the same direction) at a higher speed. The direction of rotation of the auxiliary driver is reversed before the spindle acts as a flywheel causing the connecting gear to disengage from the spindle. And bias means holds the connecting gear engaged with said spindle preventing said connecting gear from accidentally disengaging from said spindle due to fluctuation in the speed of the auxiliary driver.

Advantages of such a drive arrangement are: ease of disassembly of the turbine casing and spindle, a smaller motor can be used to rotate the spindle at a higher speed, complicated gear shifts are avoided, and a flexible gearing arrangement providing desired gear ratios may be employed.

Other advantages and objects will appear from the following description considered in conjunction with the attached drawings, in which.

Figure 1:
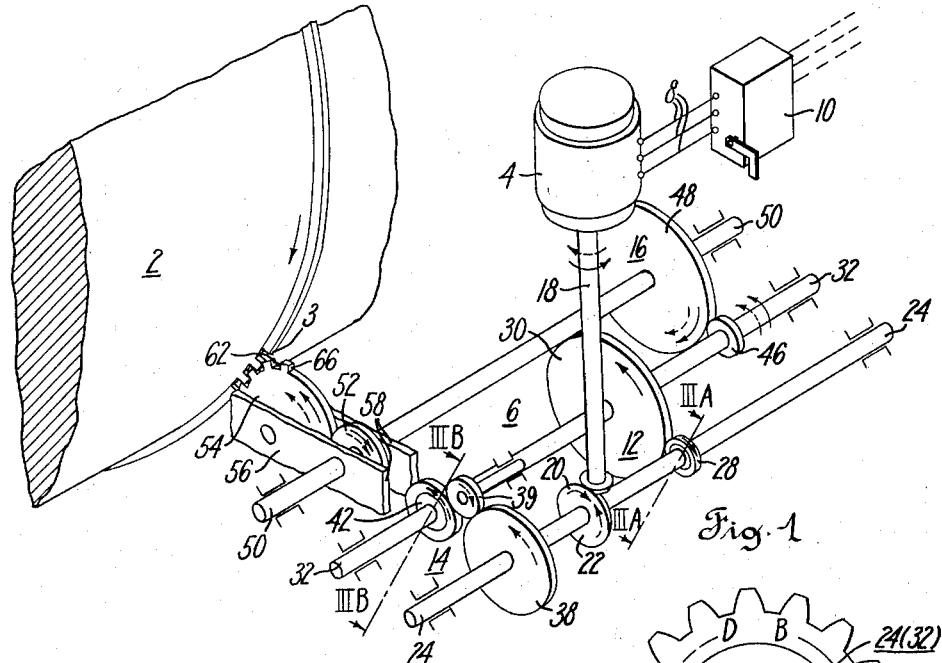
Fig. 1 is a perspective view of the auxiliary driver, gearing arrangement, and spindle, with certain portions cut away.
Figure 2:
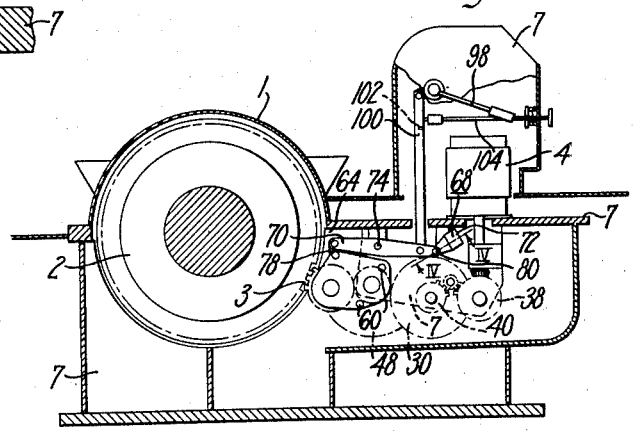
Fig. 2 is a side view of Fig. 1 taken in the direction of arrows II—II.

Referring to Figs. 1 and 2, there is disclosed a turbine casing 1 (Fig. 2) containing a spindle 2 having gear teeth 3 thereon. A reversible auxiliary driver, which in the embodiment illustrated is an electrically reversible three phase motor 4, drives the spindle through a two speed gear train drive 6. Turbine casing 1, spindle 2, electric motor 4, and two speed gear train drive 6 are supported by turbine framework 7.

Reversible motor 4 is connected by leads 8 to a source of three phase electricity (not shown). Control means which may comprise a switch 10 are provided to reverse two of the three phase leads 8 to change the direction of rotation of the motor.

Two speed gear train drive 6 interconnecting the reversible motor and the spindle comprises: a slow speed gear train (indicated generally by numeral 12), a higher speed gear train (indicated generally by numeral 14), and a connecting gear train (indicated generally by numeral 16) which interconnects the slow and higher speed gear trains with said spindle.

Reversible motor 4 rotates input shaft 18 carrying fixed bevel gear 20. Bevel gear 20 rotates second bevel gear 22 fixed to first shaft 24. First shaft 24 drives either the slow or higher speed gear train, depending on the direction the first shaft is rotated.

Slow speed gear train 12 comprises: first overrunning clutch 28 connected to first shaft 24, and first drive gear 30 fixed to a second shaft 32.

Any conventional overrunning clutch 28 can be employed. In the embodiment disclosed (Fig. 3), overrunning clutch 28 is of the roller type. A series of rollers 34 are carried between first shaft 24 and sawtooth indentations 36 provided in the hub of the clutch.

When the motor rotates counterclockwise the slow speed gear train drives the spindle. First shaft 24 is rotated in the direction indicated by arrow A in Fig. 3. Rollers 34 are wedged against sawtooth indentations 36 of the hub and clutch 28 rotates in the direction indicated by arrow B. Clutch 28 in turn rotates drive gear 30 and shaft 32. When first shaft 24 rotates in a reverse direction indicated by dotted arrow C to drive the higher speed gear train, rollers 34 can move away from first shaft 24, and first shaft 24 rotates relative to clutch 28 disconnecting said slow speed gear train from said motor.

When the motor rotates clockwise (dotted arrows, Fig. 1) higher speed gear train 12 drives spindle 2. The higher speed gear train comprises: second drive gear 38 fixed to first shaft 24, idler 39, and second overrunning clutch 42 fixed to second shaft 32. Idler 39 changes the direction of rotation of second overrunning clutch 42 so it will rotate second shaft 32 in the same direction that it was rotated by first drive gear 30 of slow speed gear train 12.

Figure 3:
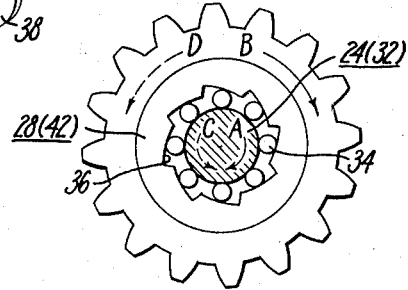
Fig. 3 is a view of Fig. 1 taken in the direction of arrows III—IIIA and III—IIIB showing side views of the overrunning clutch mechanisms in said gearing arrangement.

Second overrunning clutch 42 operates in a manner similar to first overrunning clutch 28, and Fig. 3 is used to illustrate both clutches. However, second overrunning clutch 42 rotates second shaft 32, rather than the shaft (24) rotating the overrunning clutch (28) as in the slow speed gear train. When overrunning clutch 42 rotates in the direction of dotted arrow D (Fig. 3), it drives second shaft 32 in the direction of dotted arrow C (Fig. 3). When overrunning clutch 42 is rotated in the reverse direction indicated by solid arrow B, when the slow speed gear train drives, clutch 42 overruns and rotates relative to second shaft 32.

Connecting gear train 16, that interconnects slow and higher speed gear trains 12 and 14 with spindle 4, comprises: a third drive gear 46 fixed to second shaft 32, third driven gear 48 fixed to third shaft 50, sun gear 52 fixed to and rotated by third shaft 50, and connecting gear 54 rotatable about sun gear 52. Connecting gear 54 turns spindle 2.

Connecting gear 54 is mounted in movable cradle 56 so it can be moved into and out of engagement with spindle 2. The cradle comprises two spaced plates 58 which are connected by bolts 60 (Fig. 2). Between the spaced plates at one end is the sun gear. This end is rotatably supported by third shaft 50. Between the spaced plates at the other end is connecting gear 54. The connecting gear, while always remaining in engagement with sun gear 52, moves around the sun gear when cradle 56 is moved.

Connecting gear 54 operates in the following manner on engaging the spindle. When connecting gear 54 first engages gear teeth 3 of the spindle, the pressure on the teeth of connecting gear 54 is on front face 62. Due to the large mass of the spindle, connecting gear 54 climbs spindle 2 moving cradle 56 clockwise around third shaft 50. The connecting gear will continue to climb the spindle until a stop 64 (Fig. 2) supported by framework 7 prevents further clockwise movement of the cradle. This forces said connecting gear to rotate the spindle.

The connecting gear automatically disengages from the spindle when steam rotates the spindle faster than the drive gear rotates. When steam drives, the pressure on the teeth of the connecting gear changes. The pressure changes from front face 62 to back face 66 of the teeth. This causes connecting gear 54 and cradle 56 to rotate counterclockwise around sun gear 52. In addition, gravity acts on the cradle and connecting gear. The combined effects of the spindle rotating faster than the connecting gear, and gravity, moves connecting gear 54 downwardly (Figs. 1 and 2) out of engagement with spindle 2. This provides a smooth transition from motor to steam drive.

Bias means (indicated generally by numeral 68, Fig. 2) holds connecting gear 54 in engagement with spindle 2 preventing the connecting gear from becoming accidentally disengaged or damaged.

Normally, the speed of any device used as an auxiliary driver will fluctuate slightly. That is, its speed will slightly increase and decrease. This is not serious. However, if the speed of the auxiliary driver decreases by a substantial amount, the connecting gear can become accidentally disengaged from the spindle.

In the case of an electric motor many things can cause the motor to slow up. For example, lightning can cause a change in the frequency of the power supply to the motor. Motor speed is proportional to frequency. If the frequency decreases, motor 4 slows up and the spindle rotates as a flywheel. The effect is the same as though the spindle were rotating faster than connecting gear 54. This causes the connecting gear to disengage from the spindle.

Figure 4:
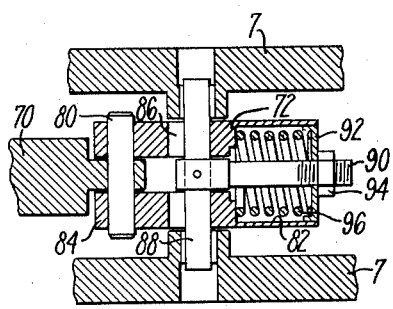
Fig. 4 is a sectional view of Fig. 2 taken in the direction of arrows IV—IV of the bias means.

The bias means employed to maintain connecting gear 54 in engagement with spindle 2 during excessive fluctuations in the speed of the auxiliary driver may comprise a toggle mechanism. The toggle mechanism comprises toggle link 70 and housing member 72 (Figs. 2 and 4).

The advantage of a toggle mechanism is that it not only holds the connecting gear engaged, but it also serves as a safety device. If the teeth of the connecting gear and spindle have disengaged more than half way, and then the speed of the auxiliary driver should increase, the teeth would be damaged since they might not go back into mesh. The toggle mechanism is set, however, so that once connecting gear 54 has moved more than half way out of mesh, the toggle snaps and disengages the connecting gear, preventing reengagement.

Toggle link 70 is pivotally supported intermediate its ends by pivot 74 in framework 7. One end of toggle link 70 is pivotally connected by second link 78 to cradle 56. The other end of toggle link 70 is pivotally connected to housing 72 by locking pin 80.

Housing 72 connected to toggle link 70 has a cavity 82 at one end, a yoke 84 at its other end that receives said toggle link, and a transverse opening 86 in its midportion.

Pivot pin 88 serves as a trunnion for housing 72. Pivot pin 88 (Fig. 4) is inserted through transverse opening 86 and is supported by framework 7. Transverse opening 86 is larger than pivot pin 88. Housing 72 can reciprocate relative to pivot pin 88. Pivot pin 88 is connected to bolt 90 which extends axially through cavity 82. Bolt 90 carries cap 92 at one end. Threaded to bolt 90 is nut 94 which locks cap 92 in place. Confined in cavity 82 by the cap is spring 96. Pivot pin 88, bolt 90 and cap 92 cannot move. Housing 72, due to larger transverse opening 86, can move relative to said pivot pin, bolt and cap. Moving the housing to the right (Fig. 4) causes cap 92 to compress spring 96 in the cavity.

The toggle mechanism 70, 72 operates in the following manner. When toggle link 70 and housing 72 are moved toward a position in alignment, the end of the toggle link moves the housing to the right as viewed in Fig. 4. This compresses spring 96 against cap 92 storing energy. When the end of the toggle link moves past center, or out of alignment, the spring gives up its stored energy snapping the toggle. Toggle mechanism 70, 72 is shown in its first position in Fig. 2, holding connecting gear 54 in engagement with spindle 2. When in its second position (not illustrated) it urges the connecting gear away from the spindle.

Means are provided for moving the cradle and, in turn, the connecting gear into engagement with the spindle.

Referring to Fig. 2, in the embodiment disclosed, the cradle is moved by means comprising lever 98 and link 100. Lever 98 is rotatably supported by framework 7. One end of lever 98 is connected to one end of link 100. The other end of link 100 is pivotally connected to toggle link 70.

Lever 98 operates in the following manner. Rotating the lever counterclockwise (as viewed in Fig. 2) causes toggle link 70 to rotate clockwise raising cradle 56, moving connecting gear 54 into engagement with spindle 2. Rotating the lever clockwise causes toggle link 70 to rotate counterclockwise lowering cradle 56, moving connecting gear 54 away from said spindle.

Referring to Fig. 2, there is disclosed an arrangement for preventing connecting gear 54 from being accidentally moved into engagement with spindle 2. Link 100 which interconnects lever 98 and toggle link 70 is provided with opening 102. Supported by framework 7 is a spring urged plunger 104. When the connecting gear moves away from the spindle, opening 102 in link 100 aligns with plunger 104, and the plunger moves into this opening. The connecting gear cannot be moved back into engagement with the spindle until the plunger is manually removed from this opening.

In summary, two speed gear train drive 6 for the spindle of an elastic fluid turbine, operates in the following manner:

When starting the spindle rotating, switch 10 is operated so reversible motor 4 rotates first shaft 24 clockwise turning the spindle through the slow speed and connecting gear trains 12 and 16. Lever 98 is moved counterclockwise snapping toggle mechanism 70, 72 and moving connecting gear 54 into engagement with spindle 2.

The slow speed drive is through first shaft 24, first overrunning clutch 28, first drive gear 30, shaft 32, third drive gear 46, third driven gear 48, shaft 50, sun gear 52, and finally, connecting gear 54.

Gear trains 12 and 16 overcome the inertia and friction of the spindle and start it rotating. Meanwhile, first shaft 24 also rotates second drive gear 38 clockwise, driving idler 39, and in turn overrunning clutch 42 in the direction of arrow B (Fig. 3). Second overrunning clutch 42 overruns, and rotates relative to second shaft 32.

Once the spindle is rotating, the direction of rotation of the motor 4 is reversed by switch 10, to drive the spindle through the higher speed gear train. On reversing, the motor rotates first shart 24 counterclockwise in the direction of arrow C (Fig. 3).

The higher speed drive is now through second drive gear 38, idler 39 which rotates overrunning clutch 42 in the direction of arrow D (Fig. 3), second shaft 32, third drive gear 46, third driven gear 48, shaft 50, sun gear 52, and finally, connecting gear 54. Meanwhile, first shaft 24 rotates relative to first overrunning clutch 28, which overruns disconnecting said slow speed gear train from said reversible motor.

The electrically reversible motor can quickly reverse its direction and pick up the load. It is to be noted that second shaft 32, third drive gear 46, third driven gear 48, third shaft 50, sun gear 52, and connecting gear 54 always rotate in the same direction regardless of the direction of rotation of motor 4. When motor 4 is reversed, only first shaft 24 and either first overrunning clutch 28 and drive gear 30, or second drive gear 38, idler 39, and second overrunning clutch 42, must reverse direction. The inertia of these members is small compared to the rest of the gearing arrangement which continues rotating.

The size of the motor depends on the bearing diameter, weight of the spindle, and the coefficient of friction between the spindle and bearings. In actual practice a 20 H.P. motor can rotate a spindle weighing approximately 188,000 pounds (the summation of the bearing diameters times the weight of the spindle is approximately 1,350,000 inch-pounds with a coefficient of friction of approximately .35 when starting and .05 when running) and reverse its direction in as little as 0.3 second to connect the higher speed gear train. The connecting gear cannot disengage in this short time.

When steam is admitted to drive the spindle, the speed of the spindle will increase and eventually rotate the connecting gear. Gravity plus the force of gear teeth 3 of the spindle on back face 66 of the teeth of the connecting gear causes the connecting gear to rotate counterclockwise (Figs. 1 and 2) around sun gear 52. This moves the connecting gear downwardly as viewed in Fig. 1. Toggle mechanism 68, 70 snaps past center moving the connecting gear out of mesh and away from the spindle, and the steam takes over.

As mentioned before, the advantages of my invention are ease of disassembly of the casing and spindle, a smaller motor can be used to rotate the spindle at a higher speed, complicated gear shift systems are avoided, and a flexible gearing arrangement providing desired gear ratios may be employed.

From the foregoing it will be apparent to those skilled in the art that the illustrated embodiment of the invention provides a two speed gear train drive, for the spindle of an elastic fluid turbine. And it will be apparent to one skilled in the art that various changes and modifications may be made therein without departing from the spirit of the invention or from the scope of the appended claims.

What is claimed is:

1. A drive arrangement for the spindle of an elastic fluid turbine, said drive arrangement operatively supported by the turbine framework, and comprising: an auxiliary driver the direction of rotation of which is reversible, control means connected to said reversible auxiliary driver to change the direction of rotation of said auxiliary driver, a two speed gear train drive interconnecting said auxiliary driver and said spindle, said two speed gear train drive including a connecting gear that is supported so it is movable into and out of engagement with said spindle to turn said spindle, means connected with said connecting gear to move it into engagement with said spindle, said two speed gear train drive turning said spindle at slow speed with high torque when said auxiliary driver rotates in one direction, and turning said spindle still in the same direction at a higher speed when said auxiliary driver rotates in a reverse direction, said spindle rotating said connecting gear out of engagement when said spindle rotates faster than said connecting gear, said control means changing the direction of rotation of said auxiliary driver, and bias means supported by the turbine framework and interconnected with said connecting gear, said bias means holding said connecting gear in engagement with said spindle preventing accidental disengagement due to abnormal fluctuations in the speed of the auxiliary driver.

2. A drive arrangement as set forth in claim 1, wherein said bias means comprises a toggle mechanism movable between two positions, said toggle mechanism in said first position holding said connecting gear engaged with said spindle preventing accidental disengagement due to abnormal fluctuations in the speed of the auxiliary driver, said spindle, when it rotates faster than said connecting gear, moving said connecting gear to a partially disengaged predetermined position away from said spindle, and also moving said toggle mechanism to a second position wherein said toggle mechanism moves said connecting gear away from said spindle to facilitate disengagement and prevent reengagement of said connecting gear and spindle.

3. A drive arrangement for the spindle of an elastic fluid turbine, said drive arrangement operatively supported by the turbine framework, and comprising: a reversible electric motor, control means to reverse the direction of rotation of said electric motor, a slow speed gear train rotated by said electric motor, said slow speed gear train containing an overrunning clutch rendering said slow speed gear train responsive to rotation of said electric motor in a first direction only, a higher speed gear train rotated by said electric motor, said higher speed gear train containing an overrunning clutch rendering said higher speed gear train responsive to rotation of said electric motor in a direction reverse to said first direction, a connecting gear train interconnecting said slow and higher speed gear trains with said spindle, said connecting gear train including a connecting gear that is supported so it is movable into and out of engagement with said spindle, said slow and higher speed gear trains constructed to rotate said connecting gear of said connecting gear train always in the same direction, means connected with said connecting gear to move it into engagement with said spindle, and a toggle mechanism supported by said turbine framework and interconnected with said connecting gear, said toggle mechanism movable to two positions, said toggle mechanism in a first position when said connecting gear is engaged with said spindle, holding said connecting gear engaged with said spindle so abnormal fluctuations in the speed of said electric motor will not cause said connecting gear to disengage from said spindle, said spindle, when it rotates faster than said connecting gear, moving said connecting gear to a partially disengaged predetermined position away from said spindle, and also moving said toggle mechanism to a second position wherein said toggle mechanism moves said connecting gear away from said spindle to facilitate disengagement and prevent reengagement of said connecting gear and spindle.

4. A drive arrangement as set forth in claim 3, wherein said movable connecting gear is positioned below the axis of said spindle so said spindle can be lifted without interference when being disassembled.

5. A drive arrangement for the spindle of an elastic fluid turbine, said drive arrangement operatively supported by the turbine framework, and comprising: a reversible electric motor, control means to reverse the direction of rotation of said electric motor, a slow speed gear train rotated by said electric motor, said slow speed gear train containing an overrunning clutch rendering said slow speed gear train responsive to rotation of said electric motor in a first direction only, a higher speed gear train rotated by said electric motor, said higher speed gear train containing an overruning clutch rendering said higher speed gear train responsive to rotation of said electric motor in a direction reverse to said first direction, a connecting gear train interconnecting said slow and higher speed gear trains with said spindle, said connecting gear train including a connecting gear that is supported so it is movable into and out of engagement with said spindle, said slow and higher speed gear trains constructed to rotate said connecting gear of said connecting gear train always in the same direction, means connected with said connecting gear to move it into engagement with said spindle, and bias means supported by said framework and interconnected with said connecting gear, said bias means aiding disengagement when said connecting gear has been partially disengaged from said spindle a predetermined amount.

6. A drive arrangement for the spindle of an elastic fluid turbine, said drive arrangement operatively supported by the turbine framework, and comprising: a reversible electric motor, control means to reverse the direction of rotation of said electric motor, a first shaft rotated by said electric motor, said first shaft when rotated by said electric motor in a first direction, rotating a slow speed high torque gear train comprising: a first overrunning clutch connected to said first shaft responsive to rotation of said first shaft in said first direction only and a first drive gear fixed to a second shaft, said first drive gear when rotated by said first overrunning clutch rotating said second shaft; said first shaft when rotated by said electric motor in a direction reverse to said first direction, rotating a higher speed gear train comprising: a second drive gear fixed to said first shaft, an idler rotated by said second drive gear, and a second overrunning clutch connected to said second shaft rotated by said idler, said second overrunning clutch only rotating said second shaft when said first shaft rotates in said direction reverse to said first direction, a connecting gear train interconnecting said slow and higher speed gear trains with said spindle comprising: a third drive gear fixed to said second shaft, a third driven gear fixed to a third shaft and rotated by said third drive gear, a sun gear fixed to said third shaft, a cradle supported by said third shaft below the axis of said spindle, and a connecting gear movably carried by said cradle, said connecting gear rotated by said sun gear and movable into and out of engagement with said spindle, means connected to said cradle to move said connecting gear into engagement with said spindle, and a toggle mechanism supported by said turbine framework and interconnected with said cradle, said toggle mechanism movable to two positions, said toggle mechanism in a first position, when said connecting gear is engaged with said spindle, holding said connecting gear engaged with said spindle so abnormal fluctuations in speed of said electric motor will not cause said connecting gear to disengage from said spindle, said spindle, when it rotates faster than said connecting gear, moving said connecting gear to a partially disengaged predetermined position away from said spindle, and also moving said toggle mechanism to a second position wherein said toggle mechanism moves said connecting gear away from said spindle to facilitate disengagement and prevent reengagement of said connecting gear and spindle.

References Cited in the file of this patent

UNITED STATES PATENTS

| 1,497,443 | Hodgkins | June 10, 1924 |
| 1,533,072 | Brockway | Apr. 7, 1925 |
| 1,985,182 | McGrath | Dec. 18, 1934 |
| 2,245,175 | Bany | June 10, 1941 |
| 2,687,658 | Nelson et al. | Aug. 31, 1954 |